United States Patent
Jin et al.

(10) Patent No.: US 9,563,344 B2
(45) Date of Patent: Feb. 7, 2017

(54) INFORMATION PROCESSING METHOD AND ELECTRONIC APPARATUS

(71) Applicant: Lenovo (Beijing) Co., Ltd., Beijing (CN)

(72) Inventors: Lingsong Jin, Beijing (CN); Zhijun Gao, Beijing (CN); Wei Su, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 247 days.

(21) Appl. No.: 14/584,645

(22) Filed: Dec. 29, 2014

(65) Prior Publication Data

US 2015/0363088 A1    Dec. 17, 2015

(30) Foreign Application Priority Data

Jun. 17, 2014   (CN) .......................... 2014 1 0271087

(51) Int. Cl.
| G06F 3/00 | (2006.01) |
| G06F 3/0484 | (2013.01) |
| G06F 3/01 | (2006.01) |

(52) U.S. Cl.
CPC ....... *G06F 3/04847* (2013.01); *G06F 3/04842* (2013.01)

(58) Field of Classification Search
None
See application file for complete search history.

(56) References Cited

U.S. PATENT DOCUMENTS

| 2008/0172634 A1* | 7/2008 | Choi ..................... G06F 1/1626 715/822 |
| 2010/0174987 A1* | 7/2010 | Shin ..................... G06F 3/0482 715/702 |
| 2011/0029867 A1* | 2/2011 | Park .................... G06F 3/04886 715/702 |
| 2013/0104079 A1* | 4/2013 | Yasui ................... G06F 3/0482 715/834 |
| 2013/0212529 A1* | 8/2013 | Amarnath ............... G06F 3/017 715/810 |
| 2013/0339904 A1* | 12/2013 | Geithner .............. G06F 3/0482 715/834 |
| 2014/0143737 A1* | 5/2014 | Mistry ................. G06F 3/0488 715/854 |
| 2015/0089431 A1* | 3/2015 | Ji ....................... G06F 3/04886 715/773 |
| 2015/0160856 A1* | 6/2015 | Jang ................... G06F 3/04886 715/773 |
| 2015/0248235 A1* | 9/2015 | Offenberg .......... G06F 3/04886 715/773 |
| 2015/0331589 A1* | 11/2015 | Kawakita ............... G06F 1/163 715/834 |
| 2015/0346921 A1* | 12/2015 | Erad ................... G06F 3/0482 715/738 |

* cited by examiner

*Primary Examiner* — Toan Vu
(74) *Attorney, Agent, or Firm* — Brinks Gilson & Lione; G. Peter Nichols

(57) ABSTRACT

An information processing method and an electronic apparatus are described where the method includes obtaining first data, displaying and outputting the first data through the display device to make a first display output region of a top end face of a frame body to present a first display effect and obtaining second data and displaying and outputting the second data through the display device to make a second display output region on the top end face of the frame body to present a second display effect.

16 Claims, 8 Drawing Sheets

INFORMATION PROCESSING METHOD AND ELECTRONIC APPARATUS

This application claims priority to Chinese patent application No. 201410271087.6 filed on Jun. 17, 2014, the entire contents of which are incorporated herein by reference.

BACKGROUND

The present disclosure relates to a field of wireless communication, and particularly relates to an information processing method and an electronic apparatus.

With popularity of the electronic apparatus such as a smart phone and a touch screen, a multi-function smart watch including the touch screen appears in market. Generally, the smart watch only displays one interface on which various kinds of information are exhibited, for example, information including time, data, temperature or the like. However, the smart watch can't be divided into a plurality of regions physically to display many different kinds of information, which results in low efficiency of usage.

SUMMARY

According to one aspect of this disclosure, it provides an information processing method applied in an electronic apparatus, wherein the electronic apparatus comprises a frame body and a fixing device which is connected to the frame body and for fixing the electronic apparatus on an operational body, and the frame body comprises a functional main body including a display device, and the method comprising: obtaining first data and displaying and outputting the first data through the display device to make a first display output region on a top end face of the frame body to present a first display effect; and obtaining second data and displaying and outputting the second data through the display device to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region.

According to one aspect of this disclosure, it provides an electronic apparatus comprising: an information processing unit for acquiring first data and second data; a frame body connected to a fixing device for fixing the electronic apparatus on an operational body; and a display device provided in a functional main body of the frame body and for displaying and outputting the first data to make a first display output region on a top end face of the frame body to present a first display effect and displaying and outputting the second data to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region.

DETAILED DESCRIPTION

First Embodiment

Figure 1:
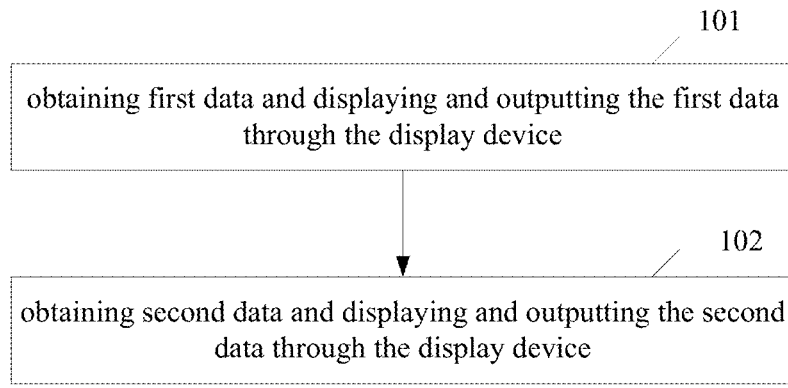
FIG. 1 is a first schematic diagram of the information processing method of the embodiments of the present disclosure.

This embodiment provides an information processing method applied in an electronic apparatus including a frame body and a fixing device which is connected to the frame body and for fixing the electronic apparatus on an operational body, and the frame body includes a functional main body including a display device, as shown in FIG. 1, the method includes:

Step 101: obtaining first data and outputting the first data through the display device to make a first display output region on top end face of the frame body to present a first display effect;

Step 102: obtaining second data and displaying and outputting the second data through the display device, to make a second display output region on the top end face of the frame body to present a second display effect; wherein, the first display effect is different from the second display effect, to make an observer of the electronic apparatus to distinguish the first display output region and the second display output region and view the first data displayed and outputted in the first display output region and the second data displayed and outputted in the second display output region.

Here, the electronic apparatus is the smart watch.

Execution of the above step 101 and step 102 does not have a certain order, step 101 may be executed firstly and then step 102 is executed in order, but step 102 can be executed firstly and then step 101 is executed, or step 101 and step 102 can be executed at the same time.

The first display output region and the second display output region both are transparent glass or plastic for protecting the display device. The first display output region and the second display output region are in a same plane, i.e., at an upper surface of the frame body.

The above-described first display output region and second display output region are two regions having distinction which can be observed intuitively on the top end face of the frame body, and it is understood that, when the first data and the second data are not outputted, an operator may also observe distinction between the two display output regions. A solution provided by the present disclosure is able to make the observer distinguish the two display output regions better when the display effects are presented in the first display output region and/or the second display output region.

The first display output region and the second display output region have an obvious demarcation, and the respective display regions are controlled by a display module commonly, or controlled by two display modules respectively.

It can be seen that, with the above-described solution, the first data and the second data having different display effects can be outputted respectively through the first display output region and the second display output region by controlling the electronic apparatus respectively. Thus, information displayed by the electronic apparatus can be increased, and the user is made to obtain more detailed and accurate information by a manner of expanded display, so as to improve the efficiency of usage of the electronic apparatus and improve user's usage experience.

Second Embodiment

Figure 2:
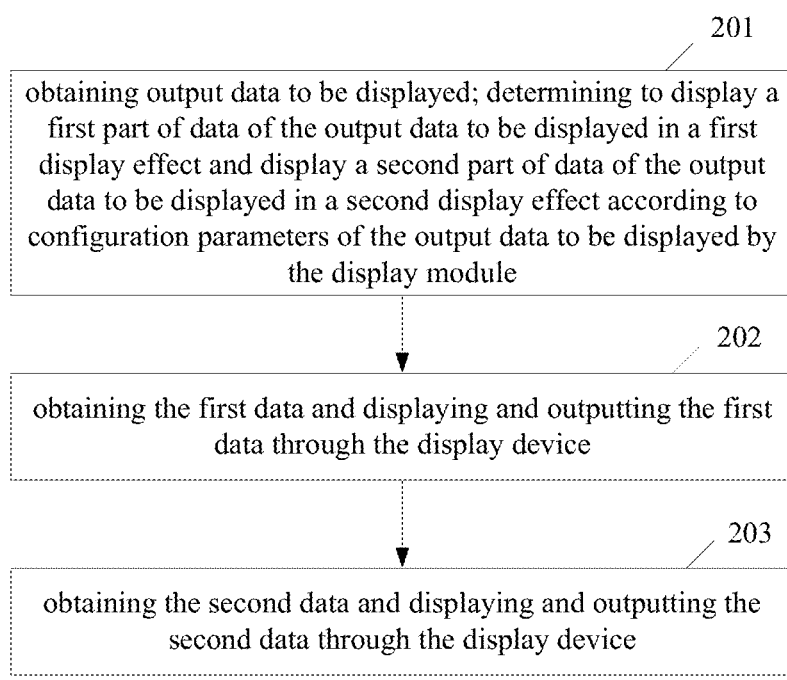
FIG. 2 is a second schematic diagram of the information processing method of the embodiments of the present disclosure.

This embodiment provides an information processing method applied in an electronic apparatus including a frame body and a fixing device which is connected to the frame body and for fixing the electronic apparatus on an operational body; the frame body includes a functional main body including a display device; the frame body is a structural body of circular shape of which an upper end portion is a circular shape; the display device is provided in the structural body of circular shape and corresponds to a display module of which a screen is corresponding to the upper end portion of the structural body of circular shape; as shown in FIG. 2, the method includes:

Step 201: obtaining output data to be displayed; determining to display a first part of data of the output data to be displayed in a first display effect and display a second part of data of the output data to be displayed in a second display effect according to configuration parameters of the output data to be displayed by the display module; wherein, the first part of data is associated with the second part of data, and the first part of data is as the first data, and the second part of data is as the second data, so that when the first data and the second data are displayed and outputted through the screen of the display module at the same time, the screen is divided into the first display output region and the second display output region with the first display effect and the second display effect.

Step 202: obtaining the first data and displaying and outputting the first data through the display device to make the first display output region on the top end face of the frame body to present the first display effect;

Step 203: obtaining the second data and displaying and outputting the second data through the display device to make the second display output region on the top end face of the frame body to present the second display effect; Wherein, the first display effect is different from the second display effect, so as to make the observer of the electronic apparatus to distinguish the first display output region and the second display output region and view the first data displayed and outputted in the first display output region and the second data displayed and outputted in the second display output region.

Here, the electronic apparatus is the smart watch.

Execution of the above steps 202 and 203 does not have a certain order, step 202 may be executed firstly and then step 203 is executed in order, but step 203 can be executed firstly and then step 202 is executed, or step 202 and step 203 can be executed at the same time.

Figure 3:
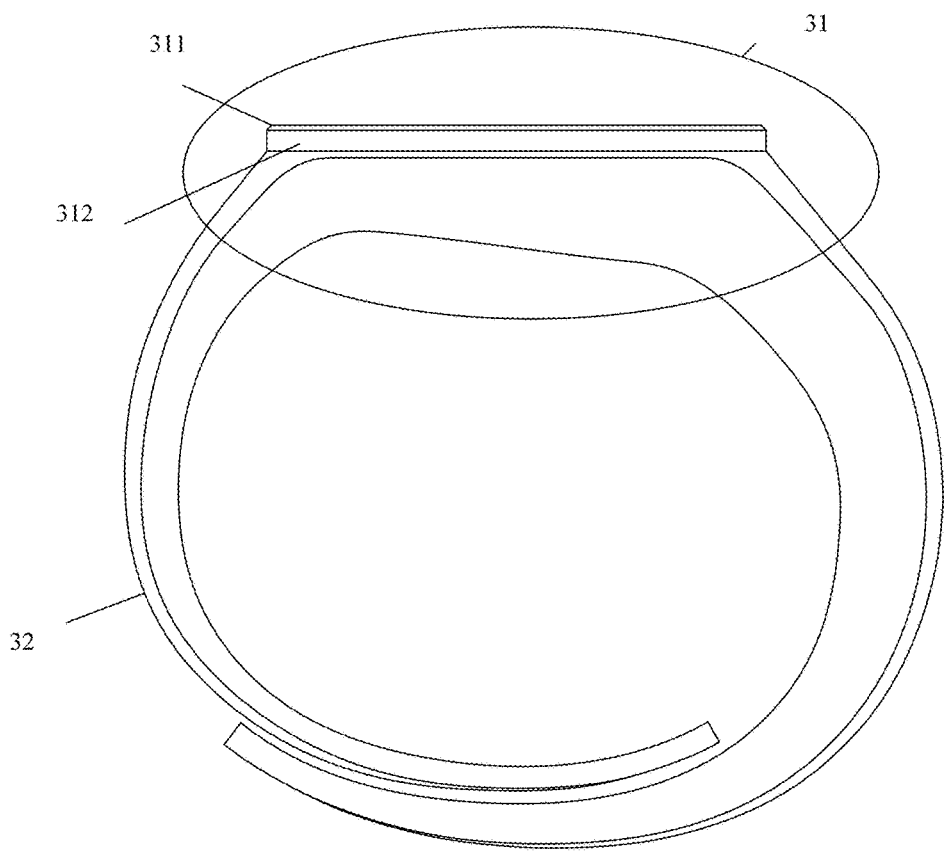
FIG. 3 is a side view of the electronic apparatus of the embodiments of the present disclosure.

FIG. 3 is a side view of the electronic apparatus described in the embodiment in which a positional relationship between a frame body 31 and a fixing structure 32 is seen, wherein, the frame body 31 is a structural body of circular shape of which an upper end portion 311 is a circular shape, a position of a display device 312 is in the structural body of circular shape, and the display device 312 includes a display module therein.

The configuration parameters of the output data to be displayed are parameters preset in the display module.

The output data to be displayed includes two parts of data including the first part of data and the second part of data.

Figure 4:
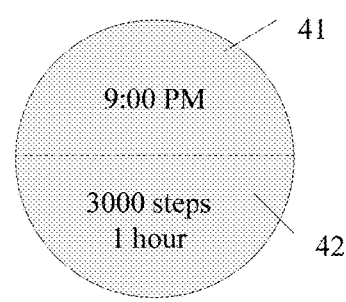
FIG. 4 is a first schematic diagram showing a display effect of the embodiments of the present disclosure.

Dividing the screen into the first display output region and the second display output region with the first display effect and the second display effect is specifically: determining a position and a size of the first display output region and a position and a size of the second display output region according to preset parameters by the display module with the screen being an integrate structure without division in physical structure, controlling the screen to dividing into two display output regions with the display effect, for example, a first display output region 41 and a second display output region 42 as in FIG. 4.

Since step 202 and step 203 do not have a certain order, the first display output region and the second display output region may be displayed at different time, and at this time, division of the two display output regions mentioned in the present embodiment can be seen obviously.

The first display output region and the second display output region both are transparent glass or plastic for protecting the display device. The first display output region and the second display output region are in a same plane, i.e., at the upper surface of the frame body.

The above-described first display output region and second display output region are two regions having distinction which can be observed intuitively on the top end face of the frame body, and it is understood that, when the first data and the second data are not outputted, the operation may observe the distinction between the two display output regions. The solution provided by the present disclosure can make the operator to distinguish the two display output regions better when the first display output region and/or the second display output region presents the display effect.

It can be seen that, with the above-described solution, the first data and the second data having different display effects can be outputted respectively through the first display output region and the second display output region by controlling the electronic apparatus respectively. Thus, the information displayed by the electronic apparatus can be increased, and the user is made to obtain more detailed and accurate information by the manner of expanded display, so as to improve the efficiency of usage of the electronic apparatus and improve user's usage experience.

Third Embodiment

Figure 5:
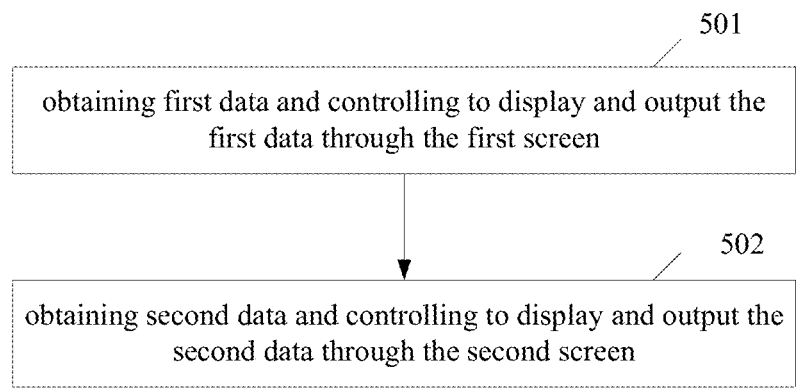
FIG. 5 is a third schematic diagram of the information processing method of the embodiments of the present disclosure.

This embodiment provides an information processing method applied in an electronic apparatus including a frame body and a fixing device which is connected to the frame body and is for fixing the electronic apparatus on an operational body; The frame body including a functional main body including a display device including a first display module; a top end face of the frame body is made of a transparent material, and the first display module includes a first screen and a second screen, and the first display module is provided under the top end face; the first screen corresponds to a first display output region on the top end face, and the second screen corresponds to the second display output region on the top end face; As shown in FIG. 5, the method includes:

Step 501: obtaining first data and controlling to display and output the first data through the first screen to make the first display output region on the top end face of the frame body to present a first display effect;

Step 502: obtaining second data and controlling to display and output the second data through the second screen to make the second display output region on the top end face of the frame body to present a second display effect; Wherein, the first display effect is different from the second display effect, so as to make the observer of the electronic apparatus to distinguish the first display output region and the second display output region and view the first data displayed and outputted in the first display output region and the second data displayed and outputted in the second display output region.

Here, the electronic apparatus is the smart watch.

Execution of the above steps 501 and 502 does not have a certain order, step 501 may be executed firstly and then step 502 is executed in order, but step 502 can be executed firstly and then step 501 is executed, or steps 501 and 502 can be executed at the same time.

The first display output region and the second display output region both are transparent glass or plastic for protecting the display device. The first display output region and the second display output region are in a same plane, i.e., at an upper surface of the frame body.

Figure 6:
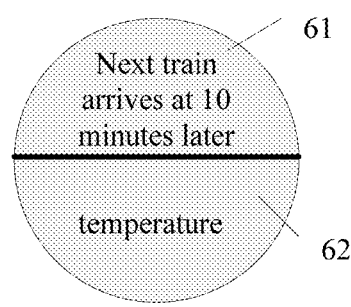
FIG. 6 is a second schematic diagram showing the display effect of the embodiments of the present disclosure.

The electronic apparatus provided by the embodiment has a display module having two screens, as shown in FIG. 6, wherein a first screen 61 and a second screen 62 can be divided physically, that is, materials of the two screens are different, for example, the first screen 61 is a screen saving electricity, and the second screen 62 is a normal screen. Position parameter and magnitude parameter of each screen are preset in the display module. It is understood that, when the first data and the second data are outputted, distinction between the two display output regions can be seen. The solution provided by the embodiment can make the operator to distinguish the two display output regions better when the first display output region and/or the second display output region presents the display effect.

Controlling to display and output the first data through the first screen includes: determining display position and display size of the first data according to display parameter of the first screen stored in advance when the display module obtains the first data. Wherein, the display parameter of the first screen includes: display color, display position, size of the display screen or the like.

It is understood that, similar to the above displaying the first data, controlling to display and output the second data through the second screen includes: determining the display position and the display size of the second data according to the display parameter of the second screen stored in advance when the display module obtains the second data. Wherein, the display parameter of the second screen includes: a display color, a display position, a size of the display screen or the like.

It can be seen that, with the above-described solution, the first data and the second data having different display effects can be outputted respectively through the first display output region and the second display output region by controlling the electronic apparatus respectively. Thus, the information displayed by the electronic apparatus can be increased, and the user is made to obtain more detailed and accurate information by the manner of expanded display, so as to improve the efficiency of usage of the electronic apparatus and improve user's usage experience.

Fourth Embodiment

Figure 7:
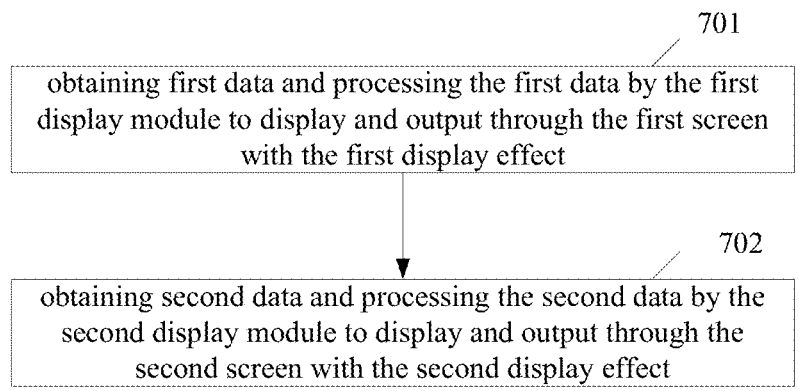
FIG. 7 is a fourth schematic diagram of the information processing method of the embodiments of the present disclosure.

This embodiment provides an information processing method applied in an electronic apparatus including a frame body and a fixing device which is connected to the frame body and is for fixing the electronic apparatus on an operational body; The frame body including a functional main body including a display device including a first display module and a second display module; wherein, display principles of the first display module and the second display module are different; the top end face of the frame body is made of transparent material, and the first display module includes a first screen, and the second display module includes a second screen; the first display module is provided under the top end face, and the first screen corresponds to a first display output region on the top end face, and the second screen corresponds to the second display output region on the top end face; a first size of the first screen is consistent with a size of the first display output region, and a second size of a second screen is less than a size of the second display output region; the perceived size of the first data presented by the first screen with the first display effect is consistent with the first display output region when the electronic apparatus is in a first distance value with the observer, and the perceived size of the second data presented by the second screen with the second display effect is larger than a size of the second display output region. As shown in FIG. 7, the method includes:

Step 701: obtaining first data and processing the first data by the first display module to display and output through the first screen with the first display effect, to make the first display output region on the top end face of the frame body to present a first display effect;

Step 702: obtaining second data and processing the second data by the second display module to display and output through the second screen with the second display effect, to make the second display output region on the top end face of the frame body to present a second display effect; wherein, the first display effect is different from the second display effect, so as to make the observer of the electronic apparatus to distinguish the first display output region and the second display output region and view the first data displayed and outputted in the first display output region and the second data displayed and outputted in the second display output region.

Here, the electronic apparatus is the smart watch. The frame body is a structural body of circular shape of which the upper end portion is a circular shape.

Execution of the above steps 701 and 702 does not have a certain order, step 701 may be executed firstly and then step 702 is executed in order, but step 702 can be executed firstly and then step 701 is executed, or steps 701 and 702 can be executed at the same time.

The first display output region and the second display output region both are transparent glass or plastic for protecting the display device. And, the first display output region and the second display output region are in a same plane, i.e., at an upper surface of the frame body.

Figure 8:
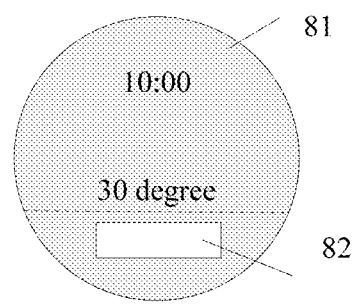
FIG. 8 is a third schematic diagram showing the display effect of the embodiments of the present disclosure.

The electronic apparatus provided by the embodiment has two display modules, as shown in FIG. 8, a first display output region 81 and a second display output region 82, and wherein the first display output region 81 may be a display effect of a normal smart watch, and may also be a display effect of a normal electronic watch. The second display output region 82 is a part positioned under dotted line and which is transparent. It is understood that, when the first data and the second data are outputted, distinction between the two display output regions can be seen. The solution provided by the embodiment can make the operator to distinguish the two display output regions better when the first display output region and/or the second display output region presents the display effect.

Figure 9:
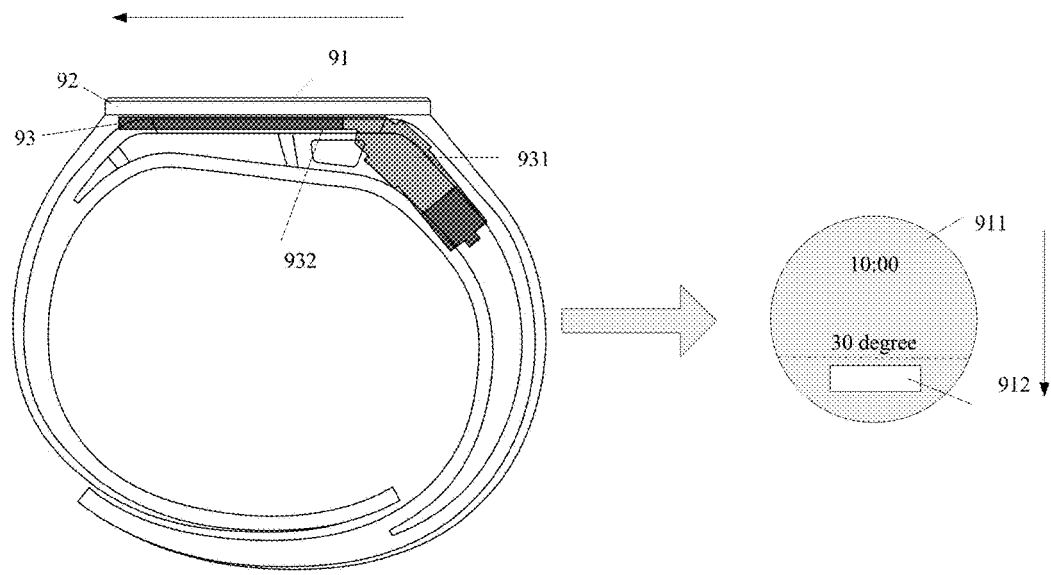
FIG. 9 is a side section view of the electronic apparatus of the embodiments of the present disclosure and schematic diagram one of the corresponding display effect.

The positional relationship between the first display module and the second display module provided by the embodiment is shown in a left view in FIG. 9, wherein, the first display module 92 is positioned under the top end face 91, and the second display module 93 is positioned under the first display module 92. The second display module further includes an optical conduction path for conducting light emitted by the second screen. A right view in FIG. 9 can represent a schematic diagram of display under such arrangement status, the first display module 92 in the right schematic diagram in FIG. 9 corresponds to the first display output region 911, and the second display module 93 corresponds to the second display output region 912.

The second display module further includes an optical conduction path for conducting light emitted by the second screen.

Wherein, as shown in a left schematic diagram in FIG. 9, a first part 931 of the optical conduction path is positioned under the first display module 92, a second part 932 of the optical conduction path has a prism for changing direction of a beam of light emitted by the second screen, to make the direction of the beam of light emitted by the second screen is consistent with the direction of the beam of light emitted by the first screen. The beam of light emitted by the second screen projects to form the second display output region according to the direction changed by the prism, the second part 932 is a part extended from the first display module and exposed by the first part 931. Wherein, the prism in the first part refracts a light ray transmitted on an oblique direction in the first part 931 originally to make the light ray to transmit in a transverse direction of the second part 932 to be displayed on the second display output region finally.

Figure 10:
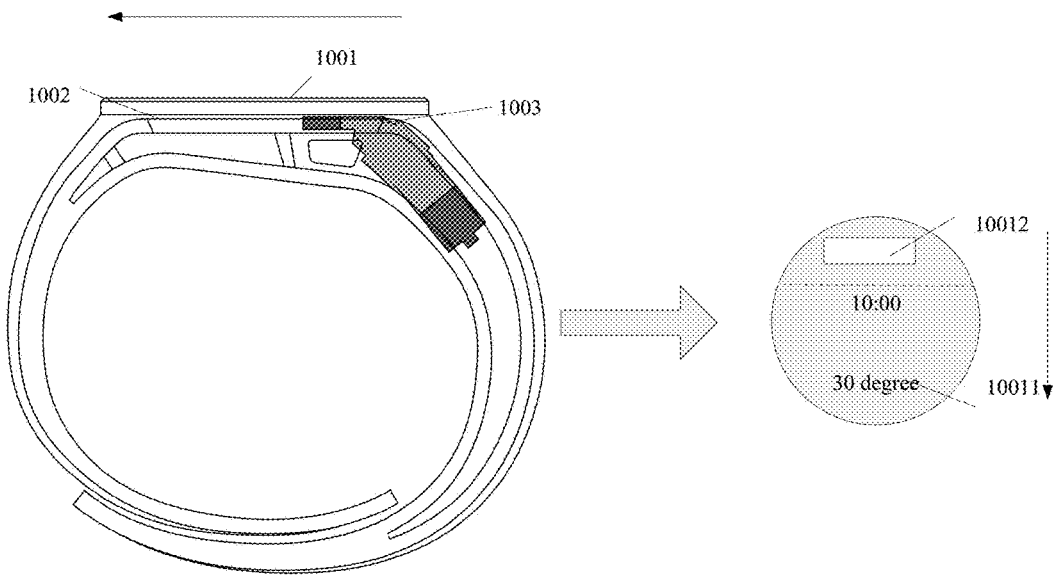
FIG. 10 is a side section view of the electronic apparatus of the embodiments of the present disclosure and schematic diagram two of the corresponding display effect.

Further, the positional relationship between the first display module and the second display module provided by the embodiment is also shown in left view in FIG. 10, the second display module 1003 is provided in the frame body, and the first display module 1002 is arranged side by side with the first display module based on a shape of the frame body. A right view in FIG. 10 can represent a schematic diagram of display under such arrangement status, a first display module 1002 in the right schematic diagram in FIG. 10 corresponds to a first display output region 10011, and a second display module 1003 corresponds to a second display output region 10012. It can be seen that when the arrangement status of the first display module and the second display module are different, the final integrate display effects are different, and the positions of the first display module and the second display module are set according to practical situation.

The first display output region corresponding to the first screen on the top end face is the first display output region 911 shown in the right view of FIG. 9. The second display output region corresponding to the second screen on the top end face is shown in the right view of FIG. 9, wherein under the dotted line is the second display output region, the second size of the second screen 912 is less than the size of the second display output region.

The first distance value is a preset range of value, for example, a distance between the electronic apparatus and the observer is a distance between eyes of the observer and the electronic apparatus, and the first distance value is set as less than 5 centimeters.

The first display module processing the first data to display and output through the first screen with the first display effect includes: determining the display position and display size of the first data according to the display parameter of the first screen stored in advance when the first display module obtains the first data, and then displaying and outputting through the first screen according to the preset first display effect in the display parameter of the first screen. Wherein, the display parameter of the first screen includes: the first display effect, the display position, the size of the display screen or the like. The first display effect includes parameters of the display color, font size or the like.

It is understood that, similar to the first data displayed above, the second display module processing the second data to display and output through the second screen with the second display effect includes: determining the display position and the display size of the second data according to the display parameter of the second screen stored in advance when the display module obtains the second data, and then displaying and outputting through the second screen according to preset second display effect in the display parameter of the second screen. Wherein, the display parameter of the second screen includes: the second display effect, the display position, the size of the display screen or the like. The second display effect includes parameters of the display color, font size or the like.

It can be seen that, with the above-described solution, the first data and the second data having different display effects can be outputted respectively through the first display output region and the second display output region by controlling the electronic apparatus respectively. Thus, the information displayed by the electronic apparatus can be increased, and the user is made to obtain more detailed and accurate information by the manner of expanded display, so as to improve the efficiency of usage of the electronic apparatus and improve user's usage experience.

Fifth Embodiment

Figure 11:
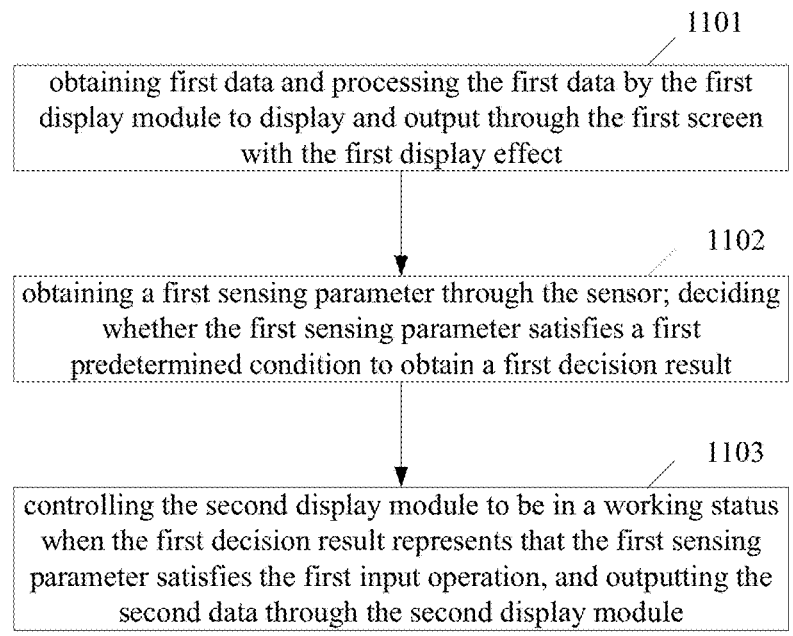
FIG. 11 is a fifth schematic diagram of the information processing method of the embodiments of the present disclosure.

This embodiment provides an information processing method applied in an electronic apparatus including a frame body and a fixing device which is connected to the frame body and is for fixing the electronic apparatus on an operational body; the frame body including a functional main body including a display device including a first display module and a second display module; wherein, display principles of the first display module and the second display module are different; the top end face of the frame body is made of transparent material, and the first display module includes a first screen, and the second display module includes a second screen; the first display module is provided under the top end face, and the first screen corresponds to a first display output region on the top end face, and the second screen corresponds to the second display output region on the top end face; a first size of the first screen is consistent with a size of the first display output region, and a second size of a second screen is less than a size of the second display output region; the perceived size of the first data presented by the first screen with the first display effect is consistent with the first display output region when the electronic apparatus is in a first distance value with the observer, and the perceived size of the second data presented by the second screen with the second display effect is larger than a size of the second display output region. The functional main body further includes: a sensor provided on the frame body; as show in FIG. 11, the method includes:

Step 1101: obtaining first data and processing the first data by the first display module to display and output through the first screen with the first display effect, to make the first display output region on the top end face of the frame body to present a first display effect;

Step 1102: obtaining a first sensing parameter through the sensor; deciding whether the first sensing parameter satisfies a first predetermined condition to obtain a first decision result, wherein, the first predetermined condition is for representing as a first input operation;

Step 1103: controlling the second display module to be in a working status when the first decision result represents that the first sensing parameter satisfies the first input operation, and outputting the second data through the second display module to make the second display output region to present the second display effect; obtaining a second data and processing the second data by the second display module to be displayed and outputted through the second screen with the second display effect, to make the second display output region on the top end face of the frame body to present a second display effect; wherein, the first display effect is different from the second display effect, so as to make the observer of the electronic apparatus to distinguish the first display output region and the second display output region and view the first data displayed and outputted in the first display output region and the second data displayed and outputted in the second display output region.

Here, the electronic apparatus is the smart watch. The frame body is a structural body of circular shape of which the upper end portion is a circular shape.

Execution of the above steps 1101 and 1102 does not have a certain order, step 1101 may be executed firstly and then step 1102 is executed in order, but step 1102 can be executed firstly and then step 1101 is executed, or steps 1101 and 1102 can be executed at the same time. Or, execution order of step 1101 and step 1102 can be determined according to the operation of the user, for example, when the user controls to display the first data, only step 1101 is executed. When the user controls to display the second data, step 1102 is controlled to be executed. When the user controls to display the first data and the second data at the same time, step 1101 and step 1102 are executed at the same time.

The first display output region and the second display output region both are transparent glass or plastic for protecting the display device. And, the first display output region and the second display output region are in a same plane, i.e., at an upper surface of the frame body.

The electronic apparatus provided by the embodiment has two display modules, as shown in FIG. 8, a first display output region 81 and a second display output region 82, and wherein the first display output region 81 may be a display effect of a normal smart watch, and may also be a display effect of a normal electronic watch. The second display output region 82 is a part positioned under dotted line and which is transparent. It is understood that, when the first data and the second data are outputted, distinction between the two display output regions can be seen. The solution provided by the embodiment can make the operator to distinguish the two display output regions better when the first display output region and/or the second display output region presents the display effect.

Figure 12:
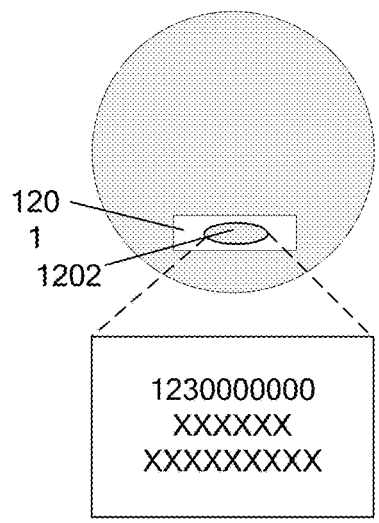
FIG. 12 is a fourth schematic diagram showing the display effect of the embodiments of the present disclosure.

The second display effect in the present embodiment may be a light spot in the second display output region. For example, as shown in FIG. 12, wherein the light spot 1202 in the second display output region 1201 is a display output effect thereof, further, abundant content is exhibited in the light spot 1202.

Further, the positional relationship between the first display module and the second display module provided by the embodiment is shown in the left view of FIG. 9, wherein, the first display module 92 is positioned under the top end face 91, and the second display module 93 is positioned under the first display module 92. The second display module further includes an optical conduction path for conducting light emitted by the second screen. The right view of FIG. 9 represents a schematic diagram of display under such arrangement status, the first display module 92 in the right schematic diagram of FIG. 9 corresponds to the first display output region 911, and the second display module 93 corresponds to the second display output region 912.

Or, the positional relationship between the first display module and the second display module provided by the embodiment is also shown in the left view of FIG. 10, the second display module 1003 is provided in the frame body, and the first display module 1002 is arranged side by side with the first display module based on a shape of the frame body. The right view of FIG. 10 represents a schematic diagram of display under such arrangement status, the first display module 1002 in the right schematic diagram of FIG. 10 corresponds to the first screen 10011, and the second display module 1003 corresponds to the second screen 10012. It can be seen that when the arrangement status of the first display module and the second display module are different, the final integrate display effects are different, and the positions of the first display module and the second display module are set according to practical situation.

The second display module further includes an optical conduction path for conducting light emitted by the second screen.

The first display output region corresponding to the first screen on the top end face is the first display output region 911 shown in the right view of FIG. 9. The second display output region corresponding to the second screen on the top end face is shown in the right view of FIG. 9, wherein under the dotted line is the second display output region, the second size of the second screen 912 is less than the size of the second display output region.

The first distance value is a preset range of value, for example, a distance between the electronic apparatus and the observer is a distance between eyes of the observer and the electronic apparatus, and the first distance value is set as less than 5 centimeters.

The first display module processing the first data to display and output through the first screen with the first display effect includes: determining the display position and display size of the first data according to the display parameter of the first screen stored in advance when the first display module obtains the first data, and then displaying and outputting through the first screen according to the preset first display effect in the display parameter of the first screen. Wherein, the display parameter of the first screen includes: the first display effect, the display position, the size of the display screen or the like. The first display effect includes parameters of the display color, font size or the like.

The inductor includes: a triaxiality gyroscope and/or a touch sensor.

Obtaining the first sensing parameter through the inductor includes at least one of the following: obtaining parameter of motion of an arm wearing the electronic apparatus by the triaxiality gyroscope, the parameter of motion includes a direction of rotating motion, an angle of rotating motion, a direction of vertical movement, a velocity of vertical movement or the like; and is specifically: detecting a direction of vertical movement as a first direction by the triaxiality gyroscope and/or that the rotating motion appears to acquire a first angle of the rotating motion.

Touch operation of the operation on the first screen and/or second screen is acquired through the touch sensor, and operational start coordinate and operational end coordinates of the touch operation are used as the first sensing parameter, wherein, the touch sensor is the first screen or the second screen itself, and may be a conventional capacitive type touch sensor.

Correspondingly, the first decision result representing that the first sensing parameter satisfies the first input operation includes:

Detecting the direction of the vertical movement firstly, and determining that the first decision result represents that the first sensing parameter satisfies the first input operation if the angle of the rotating motion exceeds a second threshold when the direction of the vertical movement is a first direction and a distance of the vertical movement exceeds a first threshold. For example, when the user wants to view the second data, he may lift his hand firstly, i.e., the distance of the vertical movement of the electronic apparatus is detected as exceeding the preset first threshold, then the user needs to rotate his wrist, so that the second data displayed in the second display output region can be seen clearly, i.e., the angle of the rotating motion of the electronic apparatus is detected as exceeding the preset second threshold, and that the user executes a series of operation of viewing the second data can be determined at this time.

It is understood that, the above-described detecting order may be exchanged, or may also executed at the same time, or only one of the parameters is detect detected, for example, only the distance of the vertical movement exceeding the preset first threshold is detected when it detects that the user lifts his hand, and then that the first sensing parameter satisfies the first input operation is determined. Or only when that the user rotates his wrist is detected, i.e., the angle of the rotating motion exceeding the preset second threshold is detected, that the first sensing parameter satisfies the first input operation is determined. Or, that the first sensing parameter satisfies the first input operation is determined when it detects that the user rotates his wrist firstly and then it detects that the user lifts his hand, that is, it determines that the angle of the rotating motion exceeds the preset second threshold firstly and then it determines that the distance of the vertical movement exceeds the preset first threshold.

Or, the first decision result representing that the first sensing parameter satisfies the first input operation includes:

Determining an operational direction corresponding to the first sensing parameter through the start position coordinate and the end position coordinate of the touch operation, and determining that the first decision result represents that the first sensing parameter satisfies the first input operation when the operational direction is compliant with a preset second direction; or, determining an operational position through start position coordinate or end position coordinate of the touch operation, and determining that the first decision result represents that the first sensing parameter satisfies the first input operation when the operational position is within range of the second display output region. For example, when the user wants to view the second data, he may execute sliding operation to the first screen and/or the second screen by his finger, and when sliding direction of the finger of the user is a direction from the first screen to the second screen, the sliding operation is determined as the first input operation. Or the user may click the second screen by his finger directly.

Similar to displaying the first data, controlling the second display module to be in the working status and outputting the second data through the second display module to make the second display output region to present the second display effect includes: determining the display position and the display size of the second data according to the display parameter of the second screen stored in advance when the display module obtains the second data, and then displaying and outputting through the second screen according to preset second display effect in the display parameter of the second screen; wherein, the display parameter of the second screen includes: the second display effect, the display position, the size of the display screen or the like. The second display effect includes parameters of the display color, font size or the like.

The embodiment further provide a usage scene, since when the user views the second data through the second display output region in short distance, the user may not need to pay attention to the first data, when the second display output region displays the second data, i.e., when step 1103 is executed, the first display output region is controlled to be turned off at the same time, as shown in FIG. 12, there is no display in the first display output region, thus, the electronic apparatus is made to save power more.

It can be seen that, with the above-described solution, the first data and the second data having different display effects can be outputted respectively through the first display output region and the second display output region by controlling the electronic apparatus respectively. Thus, the information displayed by the electronic apparatus can be increased, and the user is made to obtain more detailed and accurate information by the manner of expanded display, so as to improve the efficiency of usage of the electronic apparatus and improve user's usage experience.

Sixth Embodiment

Figure 13:
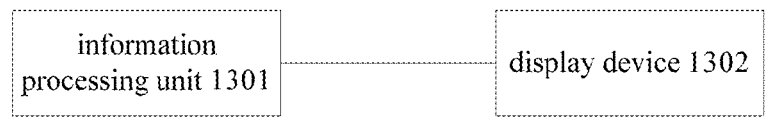
FIG. 13 is a first schematic diagram of a constitution of the electronic apparatus of the embodiments of the present disclosure.

This embodiment provides an electronic apparatus, as shown in FIG. 13, the electronic apparatus includes:

An information processing unit 1301 for acquiring first data and second data;

A display device 1302 provided in a functional main body of a frame body and for displaying and outputting the first data, to make a first display output region on a top end face of the frame body to present a first display effect; and displaying and outputting the second data to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region; the frame body is connected to the fixing device; the fixing device is for fixing the electronic apparatus on an operational body;

Here, the electronic apparatus is a smart watch.

The above-described execution of acquiring the first data and the second data does not a certain order.

The first display output region and the second display output region both are transparent glass or plastic for protecting the display device. And, the first display output region and the second display output region are in a same plane, i.e., at an upper surface of the frame body.

The above-described first display output region and second display output region are two regions having distinction which can be observed intuitively on the top end face of the frame body, and it is understood that, when the first data and the second data are not outputted, the operator may observe the distinction between the two display output regions. The solution provided by the present disclosure can make the operator to distinguish the two display output regions better when the first display output region and/or the second display output region presents the display effect.

The first display output region and the second display output region have an obvious demarcation, and the respective display regions may be controlled by a display module commonly, or may be controlled by two display modules respectively.

It can be seen that, with the above-described solution, the first data and the second data having different display effects can be outputted respectively through the first display output region and the second display output region by controlling the electronic apparatus respectively; thus, the information displayed by the electronic apparatus can be increased, and the user is made to obtain more detailed and accurate information by the manner of expanded display, so as to improve the efficiency of usage of the electronic apparatus and improve user's usage experience.

Seventh Embodiment

Figure 14:
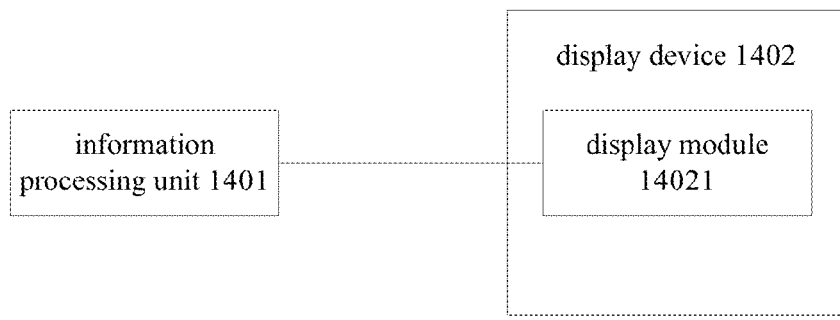
FIG. 14 is a second schematic diagram of the constitution of the electronic apparatus of the embodiments of the present disclosure.

This embodiment provides an electronic apparatus, as shown in FIG. 14, the electronic apparatus includes:

An information processing unit 1401 for acquiring first data and second data;

A display device 1402 provided in a functional main body of a frame body and for displaying and outputting the first data to make a first display output region on a top end face of the frame body to present a first display effect; and displaying and outputting the second data to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region; the frame body is connected to the fixing device; the fixing device is for fixing the electronic apparatus on an operational body;

Here, the electronic apparatus is a smart watch.

The display device is provided in the frame body, and the frame body is a structural body of circular shape of which an upper end portion is a circular shape, a screen of the display module corresponds to a top end face of the structural body of circular shape.

The display device includes a display module 14021 for obtaining output data to be displayed; determining to display a first part of data of the output data to be displayed with a first display effect and display a second part of data of the output data to be displayed with a second display effect according to configuration parameters of the output data to be displayed; wherein, the first part of data is associated with the second part of data, the first part of data is as the first data, and the second part of data is as the second data, So that the screen is divided into a first display output region and a second display output region with the first display effect and the second display effect when the first data and the second data are displayed and outputted through the screen at the same time.

FIG. 3 is a side view of the electronic apparatus described in the embodiment in which a positional relationship between the frame body 31 and the fixing structure 32 is seen, wherein, the frame body 31 is the structural body of circular shape of which the upper end portion 311 is the circular shape, a position of the display device 312 is in the structural body of circular shape, and the display device 312 includes a display module therein.

The configuration parameters of the output data to be displayed are parameters preset in the display module.

The output data to be displayed includes two parts of data including the first part of data and the second part of data.

Dividing the screen into the first display output region and the second display output region with the first display effect and the second display effect is specifically: determining a position and a size of the first display output region and a position and a size of the second display output region according to preset parameters by the display module with the screen being an integrate structure without division in physical structure, controlling the screen to dividing into two display output regions with the display effect, for example, a first display output region 41 and a second display output region 42 as in FIG. 4.

Since acquiring the first data and the second data do not have a certain order, therefore, the first display output region and the second display output region are displayed at different time, and at this time, division of the two display output regions mentioned in the present embodiment can be seen obviously.

The first display output region and the second display output region both are transparent glass or plastic for protecting the display device. And the first display output region and the second display output region are in a same plane, i.e., at an upper surface of the frame body.

The above-described first display output region and second display output region are two regions having distinction which can be observed intuitively on the top end face of the frame body, and it is understood that, when the first data and the second data are not outputted, the operator may observe the distinction between the two display output regions. The solution provided by the present disclosure can make the operator to distinguish the two display output regions better when the first display output region and/or the second display output region presents the display effect.

It can be seen that, with the above-described solution, the first data and the second data having different display effects can be outputted respectively through the first display output region and the second display output region by controlling the electronic apparatus respectively; thus, the information displayed by the electronic apparatus can be increased, and the user is made to obtain more detailed and accurate information by the manner of expanded display, so as to improve the efficiency of usage of the electronic apparatus and improve user's usage experience.

Eighth Embodiment

Figure 15:
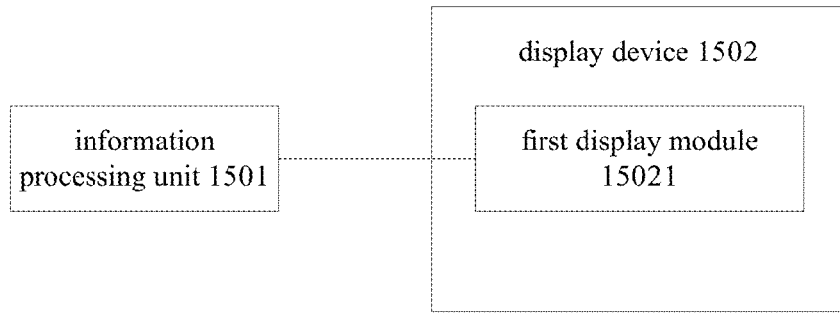
FIG. 15 is a third schematic diagram of the constitution of the electronic apparatus of the embodiments of the present disclosure.

This embodiment provides an electronic apparatus, as shown in FIG. 15, the electronic apparatus includes:

An information processing unit 1501 for acquiring first data and second data;

A display device 1502 provided in a functional main body of a frame body and for displaying and outputting the first data to make a first display output region on a top end face of the frame body to present a first display effect; and displaying and outputting the second data to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region; the frame body is connected to the fixing device; the fixing device is for fixing the electronic apparatus on an operational body;

Here, the electronic apparatus is a smart watch.

The display device includes a first display module 15021 having a first screen and a second screen and provided under the top end face, the first screen corresponds to the first display output region on the top end face, the second screen corresponds to the second display output region on the top end face, the top end face is made of a transparent material and for controlling to display and output the first data through the first screen; and controlling to display and output the second data through the second screen.

The first display output region and the second display output region both are transparent glass or plastic for protecting the display device. And the first display output region and the second display output region are in a same plane, i.e., at an upper surface of the frame body.

The electronic apparatus provided by the embodiment has a display module having two screens, as shown in FIG. 6, wherein the first screen 61 and the second screen 62 can be divided physically, that is, materials of the two screens are different, for example, the first screen 61 is a screen which saves power, and the second screen 62 is a normal screen. Position parameter and magnitude parameter of each screen are preset in the display module. It is understood that, when the first data and the second data are outputted, distinction between the two display output regions can be seen. The solution provided by the embodiment can make the operator to distinguish the two display output regions better when the first display output region and/or the second display output region presents the display effect.

It can be seen that, with the above-described solution, the first data and the second data having different display effects can be outputted respectively through the first display output region and the second display output region by controlling the electronic apparatus respectively; thus, the information displayed by the electronic apparatus can be increased, and the user is made to obtain more detailed and accurate information by the manner of expanded display, so as to improve the efficiency of usage of the electronic apparatus and improve user's usage experience.

Ninth Embodiment

Figure 16:
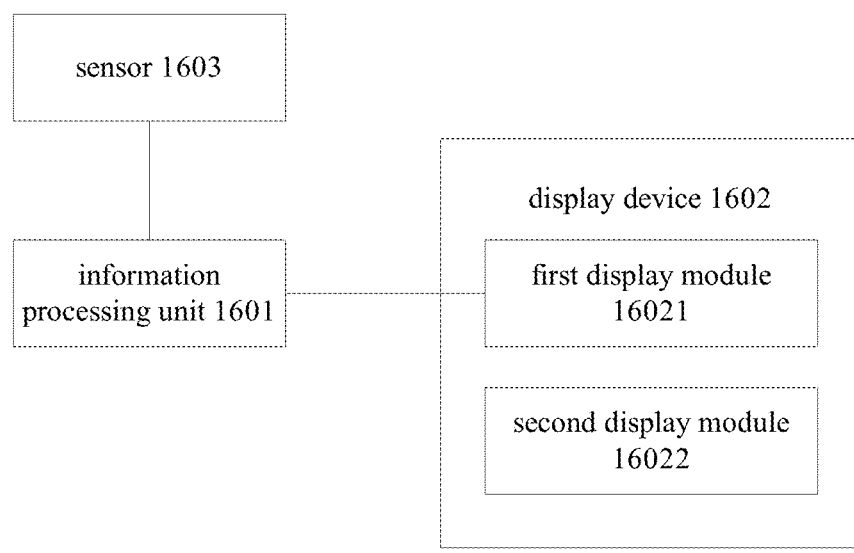
FIG. 16 is a fourth schematic diagram of the constitution of the electronic apparatus of the embodiments of the present disclosure.

This embodiment provides an electronic apparatus, as shown in FIG. 16, the electronic apparatus includes:

An information processing unit 1601 for acquiring first data and second data;

A display device 1602 provided in a functional main body of a frame body and for displaying and outputting the first data to make a first display output region on a top end face of the frame body to present a first display effect; and displaying and outputting the second data to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region. The frame body is connected to the fixing device; the fixing device is for fixing the electronic apparatus on an operational body;

Here, the electronic apparatus is a smart watch. The frame body is a structural body of circular shape of which the upper end portion is a circular shape.

The display device includes a first display module 16021 and a second display module 16022;

Wherein, the first display module has a different display principle from that of the second display module and has a first screen provided under the top end face of the structural body of circular shape; the first screen corresponds to the first display output region on the top end face; the perceived size of the second data presented by the second screen with the second display effect is larger than the size of the second display output region when there is a first distance value between the electronic apparatus and the observer; the first display module is for processing the first data to display and out the first data through the first screen with the first display effect.

The second display module has a second screen corresponding to the second display output region on the top end face, the first size of the first screen is consistent with the size of the first display output region, and the second size of the second screen is less than the size of the second display output region; the perceived size of the first data presented by the first screen with the first display effect is consistent with the first display output region when the electronic apparatus is in a first distance value with the observer; the perceived size of the second data presented by the second screen with the second display effect is larger than a size of the second display output region; and the second display module is for processing the second data to display and out the second data through the second screen with the second display effect.

The first display output region and the second display output region both are transparent glass or plastic for protecting the display device. And the first display output region and the second display output region are in a same plane, i.e., at an upper surface of the frame body.

The electronic apparatus provided by the embodiment has two display modules, as shown in FIG. 8, a first display output region 81 and a second display output region 82, and wherein the first display output region 81 may be a display effect of a normal smart watch, and may also be a display effect of a normal electronic watch. The second display output region 82 is a part positioned under dotted line and which is transparent. It is understood that, when the first data and the second data are outputted, distinction between the two display output regions can be seen. The solution provided by the embodiment can make the operator to distinguish the two display output regions better when the first display output region and/or the second display output region presents the display effect.

The positional relationship between the first display module and the second display module provided by the embodiment is shown in a left view in FIG. 9, wherein, the first display module 92 is positioned under the top end face 91, and the second display module 93 is positioned under the first display module 92. The second display module further includes an optical conduction path for conducting light emitted by the second screen. The right view of FIG. 9 can represent a schematic diagram of display under such arrangement status, the first display module 92 in the right schematic diagram of FIG. 9 corresponds to the first display output region 911, and the second display module 93 corresponds to the second display output region 912.

The second display module further includes an optical conduction path for conducting light emitted by the second screen.

Wherein, as shown in the left schematic diagram of FIG. 9, the first part 931 of the optical conduction path is positioned under the first display module 92, the second part 932 of the optical conduction path has a prism for changing direction of a beam of light emitted by the second screen, to make the direction of the beam of light emitted by the second screen is consistent with the direction of the beam of light emitted by the first screen. The beam of light emitted by the second screen projects to form the second display output region according to the direction changed by the prism, the second part 932 is a part extended from the first display module and exposed by the first part 931. Wherein, the prism in the first part refracts a light ray transmitted on an oblique direction in the first part 931 originally to make the light ray to transmit in a transverse direction of the second part 932 to be displayed on the second display output region finally.

Further, the positional relationship between the first display module and the second display module provided by the embodiment is also shown in the left view of FIG. 10, the second display module 1003 is provided in the frame body, and the first display module 1002 is arranged side by side with the first display module based on a shape of the frame body. The right view of FIG. 10 can represent a schematic diagram of display under such arrangement status, the first display module 1002 in the right schematic diagram of FIG. 10 corresponds to a first display output region 10011, and the second display module 1003 corresponds to a second display output region 10012. It can be seen that when the arrangement status of the first display module and the second display module are different, the final integrate display effects are different, and the positions of the first display module and the second display module are set according to practical situation.

The first display output region corresponding to the first screen on the top end face is the first display output region 911 shown in the right view of FIG. 9. The second display output region corresponding to the second screen on the top end face is shown in the right view of FIG. 9, wherein under the dotted line is the second display output region, the second size of the second screen 912 is less than the size of the second display output region.

The first distance value is a preset range of value, for example, a distance between the electronic apparatus and the observer is a distance between eyes of the observer and the electronic apparatus, and the first distance value is set as less than 5 centimeters.

The first display module is specifically for determining the display position and display size of the first data according to the display parameter of the first screen stored in advance when the first data is obtained, and then displaying and outputting through the first screen according to the preset first display effect in the display parameter of the first screen. Wherein, the display parameter of the first screen includes: the first display effect, the display position, the size of the display screen or the like. The first display effect includes parameters of the display color, font size or the like.

It is understood that, similar to the above displaying the first data, the second display module is specifically for determining the display position and the display size of the second screen according to the display parameter of the second screen stored in advance when the second screen is obtained, and then displaying and outputting through the second screen according to the preset second display effect in the display parameter of the second screen. Wherein, the display parameter of the second screen includes: the second display effect, the display position, the size of the display screen or the like. The second display effect includes parameters of the display color, font size or the like.

It can be seen that, with the above-described solution, the first data and the second data having different display effects can be outputted respectively through the first display output region and the second display output region by controlling the electronic apparatus respectively; thus, the information displayed by the electronic apparatus can be increased, and the user is made to obtain more detailed and accurate information by the manner of expanded display, so as to improve the efficiency of usage of the electronic apparatus and improve user's usage experience.

Tenth Embodiment

This embodiment provides an electronic apparatus, as shown in FIG. 17, the electronic apparatus includes:

An information processing unit 1701 for acquiring first data and second data;

A display device 1702 provided in a functional main body of a frame body and for displaying and outputting the first data to make a first display output region on a top end face of the frame body to present a first display effect; and displaying and outputting the second data to make a second display output region on the top end face of the frame body to present a second display effect; wherein, the first display effect is different from the second display effect, so as to make an observer of the electronic apparatus to distinguish the first display output region and the second display output region and view the first data displayed and outputted in the first display output region and the second data displayed and outputted in the second display output region. The frame body is connected to the fixing device; the fixing device is for fixing the electronic apparatus on an operational body;

Here, the electronic apparatus is a smart watch. The frame body is a structural body of circular shape of which the upper end portion is a circular shape.

When the user controls to display the first data through the information processing unit, only step 1101 is executed. When the user controls to display the second data, step 1102 is controlled to be executed. When the user controls to display the first data and the second data at the same time, step 1101 and step 1102 are executed at the same time.

The first display output region and the second display output region both are transparent glass or plastic for protecting the display device. And the first display output region and the second display output region are in a same plane, i.e., at an upper surface of the frame body.

In the electronic apparatus provided by the embodiment, the display device includes a first display module 17021 and a second display module 17022. Wherein, The first display module has a different display principle from that of the second display module and has a first screen provided under the top end face of the structural body of circular shape, and the first screen corresponds to the first display output region on the top end face; the perceived size of the second data presented by the second screen with the second display effect is larger than the size of the second display output region when there is a first distance value between the electronic apparatus and the observer; the first display module is for processing the first data to display and out the first data through the first screen with the first display effect.

The second display module has a second screen corresponding to the second display output region on the top end face, the first size of the first screen is consistent with the size of the first display output region, and the second size of the second screen is less than the size of the second display output region; the perceived size of the first data presented by the first screen with the first display effect is consistent with the first display output region when the electronic apparatus is in a first distance value with the observer; the perceived size of the second data presented by the second screen with the second display effect is larger than a size of the second display output region; and the second display module is for processing the second data to display and out the second data through the second screen with the second display effect.

As shown in FIG. 8, in a first display output region 81 and a second display output region 82, wherein the first display output region 81 may be a display effect of a normal smart watch, and may also be a display effect of a normal electronic watch. The second display output region 82 is a part positioned under dotted line and which is transparent. It is understood that, when the first data and the second data are outputted, distinction between the two display output regions can be seen. The solution provided by the embodiment can make the operator to distinguish the two display output regions better when the first display output region and/or the second display output region presents the display effect.

The second display effect in the present embodiment is a light spot in the second display output region. For example, as shown in FIG. 12, wherein the light spot 1202 in the second display output region 1201 is a display output effect thereof, further, abundant content is exhibited in the light spot 1202.

Further, the positional relationship between the first display module and the second display module provided by the embodiment is shown in the left view of FIG. 9, wherein, the first display module 92 is positioned under the top end face 91, and the second display module 93 is positioned under the first display module 92. The second display module further includes an optical conduction path for conducting light emitted by the second screen. The right view of FIG. 9 represents a schematic diagram of display under such arrangement status, the first display module 92 in the right schematic diagram of FIG. 9 corresponds to the first display output region 911, and the second display module 93 corresponds to the second display output region 912.

Or, the positional relationship between the first display module and the second display module provided by the embodiment is also shown in the left view of FIG. 10, the second display module 1003 is provided in the frame body, and the first display module 1002 is arranged side by side with the first display module based on a shape of the frame body. The right view of FIG. 10 represents a schematic diagram of display under such arrangement status, the first display module 1002 in the right schematic diagram of FIG. 10 corresponds to the first screen 10011, and the second display module 1003 corresponds to the second screen 10012. It can be seen that when the arrangement status of the first display module and the second display module are different, the final integrate display effects are different, and the positions of the first display module and the second display module are set according to practical situation.

The second display module further includes an optical conduction path for conducting light emitted by the second screen.

The first display output region corresponding to the first screen on the top end face is the first display output region 911 shown in the right view of FIG. 9. The second display output region corresponding to the second screen on the top end face is shown in the right view of FIG. 9, wherein under the dotted line is the second display output region, the second size of the second screen 912 is less than the size of the second display output region.

The first distance value is a preset range of value, for example, a distance between the electronic apparatus and the observer is a distance between eyes of the observer and the electronic apparatus, and the first distance value is set as less than 5 centimeters.

The first display module is specifically for determining the display position and display size of the first data according to the display parameter of the first screen stored in advance when the first display module obtains the first data, and then displaying and outputting through the first screen according to the preset first display effect in the display parameter of the first screen. Wherein, the display parameter of the first screen includes: the first display effect, the display position, the size of the display screen or the like. The first display effect includes parameters of the display color, font size or the like.

The electronic apparatus further include: a sensor 1703 provided in the functional main body of the frame body and for obtaining a first sensing parameter.

Correspondingly, the information processing unit 1701 is further for deciding whether the first sensing parameter satisfies a first predetermined condition to obtain a first decision result, wherein, the first predetermined condition is for representing as the first input operation. And for controlling the second display module to be in a working status when the first decision result represents that the first sensing parameter satisfies the first input operation, and outputting the second data through the second display module to make the second display output region to present the second display effect.

The sensor includes: a triaxiality gyroscope and/or a touch sensor.

Obtaining the first sensing parameter through the inductor includes at least one of the following: obtaining parameter of motion of an arm wearing the electronic apparatus by the triaxiality gyroscope, the parameter of motion includes a direction of rotating motion, an angle of rotating motion, a direction of vertical movement, a velocity of vertical movement or the like; and is specifically: detecting a direction of vertical movement as a first direction by the triaxiality gyroscope and/or that the rotating motion appears to acquire a first angle of the rotating motion.

Touch operation of the operation on the first screen and/or second screen is acquired through the touch sensor, and operational start coordinate and operational end coordinates of the touch operation are used as the first sensing parameter, wherein, the touch sensor is the first screen or the second screen itself, and may be a conventional capacitive type touch sensor.

Correspondingly, the first decision result representing that the first sensing parameter satisfies the first input operation includes:

Detecting the direction of the vertical movement firstly, and determining that the first decision result represents that the first sensing parameter satisfies the first input operation if the angle of the rotating motion exceeds a second threshold when the direction of the vertical movement is a first direction and a distance of the vertical movement exceeds a first threshold. For example, when the user wants to view the second data, he may lift his hand firstly, i.e., the distance of the vertical movement of the electronic apparatus is detected as exceeding the preset first threshold, then the user needs to rotate his wrist, so that the second data displayed in the second display output region can be seen clearly, i.e., the angle of the rotating motion of the electronic apparatus is detected as exceeding the preset second threshold, and that the user executes a series of operation of viewing the second data can be determined at this time.

It is understood that, the above-described detecting order may be exchanged, or may also executed at the same time, or only one of the parameters is detect detected, for example, only the distance of the vertical movement exceeding the preset first threshold is detected when it detects that the user lifts his hand, and then that the first sensing parameter satisfies the first input operation is determined. Or only when that the user rotates his wrist is detected, i.e., the angle of the rotating motion exceeding the preset second threshold is detected, that the first sensing parameter satisfies the first input operation is determined. Or, that the first sensing parameter satisfies the first input operation is determined when it detects that the user rotates his wrist firstly and then it detects that the user lifts his hand, that is, it determines that the angle of the rotating motion exceeds the preset second threshold firstly and then it determines that the distance of the vertical movement exceeds the preset first threshold.

Or, the first decision result representing that the first sensing parameter satisfies the first input operation includes:

Determining an operational direction corresponding to the first sensing parameter through the start position coordinate and the end position coordinate of the touch operation, and determining that the first decision result represents that the first sensing parameter satisfies the first input operation when the operational direction is compliant with a preset second direction; or, determining an operational position through start position coordinate or end position coordinate of the touch operation, and determining that the first decision result represents that the first sensing parameter satisfies the first input operation when the operational position is within range of the second display output region. For example, when the user wants to view the second data, he may execute sliding operation to the first screen and/or the second screen by his finger, and when sliding direction of the finger of the user is a direction from the first screen to the second screen, the sliding operation is determined as the first input operation. Or the user may click the second screen by his finger directly.

Similar to displaying the first data, the second display module being specifically for being in the working status and outputting the second data to make the second display output region to present the second display effect includes: determining the display position and the display size of the second data according to the display parameter of the second screen stored in advance when the display module obtains the second data, and then displaying and outputting through the second screen according to preset second display effect in the display parameter of the second screen; wherein, the display parameter of the second screen includes: the second display effect, the display position, the size of the display screen or the like. The second display effect includes parameters of the display color, font size or the like.

The embodiment further provide a usage scene, since when the user views the second data through the second display output region in short distance, the user may not need to pay attention to the first data, when the second display output region displays the second data, i.e., when step 1103 is executed, the first display output region is controlled to be turned off at the same time, as shown in FIG. 12, there is no display in the first display output region, thus, the electronic apparatus is made to save power more.

It can be seen that, with the above-described solution, the first data and the second data having different display effects can be outputted respectively through the first display output region and the second display output region by controlling the electronic apparatus respectively; thus, the information displayed by the electronic apparatus can be increased, and the user is made to obtain more detailed and accurate information by the manner of expanded display, so as to improve the efficiency of usage of the electronic apparatus and improve user's usage experience.

The information processing method and the electronic apparatus provided by the present disclosure are able to output first data and second data which are different display effects through a first display output region and a second display output region respectively by controlling the electronic apparatus respectively. Thus, information displayed by the electronic apparatus can be increased, and the user is made to obtain more detailed and accurate information by a manner of expanded display, so as to improve the efficiency of usage of the electronic apparatus and improve user's usage experience.

In the several embodiments provided by this disclosure, it is understood that the disclosed apparatus and method can be implemented by other means. For example, the above-described embodiments of the apparatus are only schematic, for example, the division of the units is only a logical functional division, and there can be other manners of division in the actual implementation, for example, a plurality of units or components can be combined or integrated into another system, or some features can be neglected or are not implemented. Further, coupling or direct coupling or communication connection between the respective constituent parts shown or discussed may be indirect coupling or communication connection through some interfaces, apparatus or units, and may be electrical, mechanical or other forms.

The above-described units explained as separate components may be, or may not be separated physically, and the components shown as units may be or may not be physical unit, that is, they may be positioned at one location, or may also be distributed to a plurality of network units. Object of the solution of the embodiments can be implemented by selecting some or all of the units according to actual requirement.

Further, all of the respective functional units in the respective embodiments of the present disclosure may be integrated into a processing module, or the respective units may be as a separate unit respectively, or two or more units may be integrated into one unit. The above-described integrated unit can be implemented by form of hardware, or may be implemented by form of hardware plus software functional unit.

Those skilled in the art can understand, all or a part of steps for implementing the above-described embodiment of method can be implemented by hardware related to the program instruction, and the aforementioned program may be stored in a computer readable storage medium, and the program executes steps including the above-described embodiment of method as being executed. And the aforementioned storage medium includes various media which can store program code such as a mobile storage apparatus, a read-only memory (ROM), a random access memory (RAM), a disc or an optical disk.

The above mentioned is only the detailed implementation of the present invention, but the range sought for protection of the present invention is not limited thereto, variation or replacement thought out by those skilled in the art easily in the technical range disclosed in the present invention should be covered within the range sought for protection by the present invention. Therefore, a range sought for protection of this disclosure is defined by the range sought for protection of the claims.

The invention claimed is:

1. An information processing method applied in an electronic apparatus, the method comprising:
obtaining first data and displaying and outputting the first data through a display device to make a first display output region of the electronic apparatus to present a first display effect; and
obtaining second data and displaying and outputting the second data through the display device to make a second display output region of the electronic apparatus to present a second display effect different from the first display effect, wherein the electronic apparatus comprises a frame body and a fixing device that is connected to the frame body and fixes the electronic apparatus on an operational body, with the frame body comprising a functional main body including the display device, and the frame body is a structural body of circular shape of which an upper end portion is a circular shape, and the display device is provided in the structural body of circular shape, and the display device includes a display module of which a screen corresponds to the upper end portion of the structural body of circular shape; the method further comprising:
obtaining output data to be displayed; and
determining to display a first part of data of the output data to be displayed with the first display effect and display a second part of data of the output data to be displayed with the second display effect according to configuration parameters of the output data to be displayed by the display module;
wherein, the first part of data is associated with the second part of data, and the first part of data is as the first data, and the second part of data is as the second data, so that a screen of the display module is divided into the first display output region and the second display output region with the first display effect and the second display effect when the first data and the second data are displayed and outputted through the screen at the same time.

2. The method according to claim 1, wherein the first display output region and the second display output region are in a same plane.

3. The method according to claim 1, wherein the display device includes a first display module, and a top end face of a frame body of the electronic apparatus is made of a transparent material, and the first display module includes a first screen and a second screen, and the first display module is provided under the top end face, and the first screen corresponds to the first display output region on the top end face, and the second screen corresponds to the second display output region on the top end face; and the method includes:
displaying and outputting the first data through the display device includes controlling the first data to be displayed and outputted through the first screen; and
displaying and outputting the second data through the display device includes controlling the second data to be displayed and outputted through the second screen.

4. The method according to claim 3, wherein the frame body is a structural body of circular shape of which an upper end portion is a circular shape.

5. The method according to claim 1, wherein, the display device includes a first display module and a second display module;
wherein display principles of the first display module and the second display module are different;
a top end face of a frame body of the electronic apparatus is made of a transparent material, and the first display module includes a first screen, and the second display module includes a second screen;
the first display module is provided under the top end face, and the first screen corresponds to the first display output region on the top end face, and the second screen corresponds to the second display output region on the top end face;
a first size of the first screen is consistent with a size of the first display output region, and a second size of the second screen is less than a size of the second display output region; and
a perceived size of the first data presented by the first screen with the first display effect is consistent with the first display output region when the electronic apparatus is in a first distance value with an observer, and a perceived size of the second data presented by the second screen with the second display effect is larger than the size of the second display output region;
displaying and outputting the first data through the display device includes processing the first data by the first display module to display and output the first data through the first screen with the first display effect; and
displaying and outputting the second data through the display device includes processing the second data by the second display module to display and output the second data through the second screen with the second display effect.

6. The method according to claim 5, wherein the second display module is provided in the frame body and the second display module is arranged side by side with the first display module based on a shape of the frame body, and the second display module further includes an optical conduction path for conducting light emitted by the second screen.

7. The method according to claim 6, wherein a first part of the optical conduction path is positioned under the first display module and a second part of the optical conduction path has a prism for changing a direction of a beam of light emitted by the second screen to make the direction of the beam of light emitted by the second screen consistent with a direction of a beam of light emitted by the first screen; and the beam of light emitted by the second screen is emitted to form the second display output region according to the direction changed by the prism and the second part is a part extended from the first display module and exposed by the first part.

8. The method according to claim 7, wherein, the functional main body further comprises a sensor provided in the frame body; and the method includes:
obtaining the second data and processing the second data to display and output the second data through the second screen with the second display effect by the second display module to make the second display output region on the top end face of the frame body to present the second display effect specifically comprising:
obtaining a first sensing parameter through the sensor;
deciding whether the first sensing parameter satisfies a first predetermined condition;
obtaining a first decision result, wherein the first predetermined condition is for representing as a first input operation; and
controlling the second display module to be in a working status when the first decision result represents that the first sensing parameter satisfies the first input operation, and outputting the second data through the second display module to make the second display output region to present the second display effect.

9. An electronic apparatus comprising:
a processor and memory;
an information processing unit for acquiring first data and second data;
a frame body connected to a fixing device for fixing the electronic apparatus on an operational body, the frame body is a structural body of circular shape of which an upper end portion is a circular shape; and
a display device provided in a functional main body of the frame body and for displaying and outputting the first data to make a first display output region on a top end face of the frame body to present a first display effect and displaying and outputting the second data to make a second display output region on the top end face of the frame body to present a second display effect;
wherein, the first display effect is different from the second display effect so as to make an observer of the electronic apparatus to distinguish the first display output region and the second display output region and view the first data displayed and outputted in the first display output region and the second data displayed and outputted in the second display output region,
wherein the display device includes a display module with a screen that corresponds to a top end face of the structural body of circular shape wherein the display module obtains output data to be displayed, and determines to display a first part of data of the output data to be displayed with the first display effect and to display a second part of data of the output data to be displayed with the second display effect according to configuration parameters of the output data to be displayed, wherein, the first part of data is associated with the second part of data, and the first part of data is as the first data, and the second part of data is as the second data, so that the screen is divided into the first display output region and the second display output region with the first display effect and the second display effect when the first data and the second data are displayed and outputted through the screen at the same time.

10. The electronic apparatus according to claim 9, wherein the first display output region and the second display output region are in a same plane.

11. The electronic apparatus according to claim 9, wherein the display device includes a first display module having a first screen and a second screen and provided under the top end face, and the first screen corresponds to the first display output region on the top end face, and the second screen corresponds to the second display output region on the top end face, and the top end face is made of a transparent material and for controlling to display and output the first data through the first screen and controlling to display and output the second data through the second screen.

12. The electronic apparatus according to claim 11, wherein the frame body is a structural body of circular shape of which an upper end portion is a circular shape.

13. The electronic apparatus according to claim 12, wherein the second display module is provided in the frame body and the second display module is arranged side by side with the first display module based on a shape of the frame body and the second display module further includes an optical conduction path for conducting light emitted by the second screen.

14. The electronic apparatus according to claim 13, wherein a first part of the optical conduction path is positioned under the first display module, and a second part of the optical conduction path has a prism for changing a direction of a beam of light emitted by the second screen, to make the direction of the beam of light emitted by the second screen consistent with a direction of a beam of light emitted by the first screen; and
the beam of light emitted by the second screen is emitted to form the second display output region according to the direction changed by the prism, and the second part is a part extended from the first display module and exposed by the first part.

15. The electronic apparatus according to claim 14, wherein, the electronic apparatus further comprises:
a sensor provided in the functional main body of the frame body and for obtaining a first sensing parameter; wherein
the information processing unit is further for deciding whether the first sensing parameter satisfies a first predetermined condition to obtain a first decision result, wherein, the first predetermined condition is for representing as a first input operation; and
the information processing unit is further for controlling the second display module to be in a working status when the first decision result represents that the first sensing parameter satisfies the first input operation, and outputting the second data through the second display module to make the second display output region to present the second display effect.

16. The method according to claim 9, wherein the display device includes a first display module and a second display module; wherein,
the first display module has a different display principle from that of the second display module and has a first screen provided under the top end face of the structural body of circular shape, and the first screen corresponds to the first display output region on the top end face;

and a perceived size of the second data presented by the second screen with the second display effect is larger than a size of the second display output region when there is a first distance value between the electronic apparatus and the observer; and the first display module is for processing the first data to display and output the first data through the first screen with the first display effect;

the second display module has a second screen corresponding to the second display output region on the top end face, a first size of the first screen is consistent with a size of the first display output region, and a second size of the second screen is less than the size of the second display output region; and a perceived size of the first data presented by the first screen with the first display effect is consistent with the first display output region when the electronic apparatus is in a first distance value with the observer; and a perceived size of the second data presented by the second screen with the second display effect is larger than the size of the second display output region; and the second display module is for processing the second data to display and output the second data through the second screen with the second display effect.

\* \* \* \* \*